US009455546B2

(12) United States Patent
Griseri et al.

(10) Patent No.: US 9,455,546 B2
(45) Date of Patent: Sep. 27, 2016

(54) RAMAN-BASED STATIC AND DYNAMIC TILT CONTROL IN AN OPTICAL SYSTEM

(71) Applicant: Cisco Technology, Inc., San Jose, CA (US)

(72) Inventors: Enrico Griseri, Monza (IT); Mauro Brunella, Brugherio (IT); Rosanna Pastorelli, Melegnano (IT); Stefano Piciaccia, Milan (IT)

(73) Assignee: Cisco Technology, Inc., San Jose, CA (US)

( * ) Notice: Subject to any disclaimer, the term of this patent is extended or adjusted under 35 U.S.C. 154(b) by 77 days.

(21) Appl. No.: 14/601,570

(22) Filed: Jan. 21, 2015

(65) Prior Publication Data
US 2016/0211643 A1    Jul. 21, 2016

(51) Int. Cl.
| H01S 3/00 | (2006.01) |
| H01S 3/13 | (2006.01) |
| H01S 3/30 | (2006.01) |
| H01S 3/131 | (2006.01) |
| H04B 10/079 | (2013.01) |
| H04J 14/02 | (2006.01) |

(52) U.S. Cl.
CPC ........... *H01S 3/1301* (2013.01); *H01S 3/1305* (2013.01); *H01S 3/1312* (2013.01); *H01S 3/302* (2013.01); *H04B 10/0797* (2013.01); *H04J 14/0221* (2013.01)

(58) Field of Classification Search
CPC .. H01S 3/1312; H01S 3/1301; H01S 3/1305; H01S 3/302; H04B 10/0797; H04J 14/0221
USPC ................................... 359/337.11
See application file for complete search history.

(56) References Cited

U.S. PATENT DOCUMENTS

| 5,903,385 | A | 5/1999 | Sugaya et al. |
| 6,091,539 | A | 7/2000 | Kosaka |
| 6,233,091 | B1 | 5/2001 | Kosaka et al. |
| 6,388,801 | B1 | 5/2002 | Sugaya et al. |
| 6,930,823 | B2 | 8/2005 | Nakamoto et al. |
| 6,961,522 | B1 | 11/2005 | Castagnetti et al. |
| 7,174,097 | B2 | 2/2007 | Alleston et al. |
| 7,636,192 | B2 * | 12/2009 | Zhou ............. H01S 3/06758 359/334 |
| 8,477,411 | B2 | 7/2013 | Griseri et al. |

(Continued)

OTHER PUBLICATIONS

Kim, et al., "In Situ Design Method for Multichannel Gain of a Distributed Raman Amplifier with Multiwave OTDR," IEEE Photonics Technology Letters, vol. 14, No. 12, Dec. 2002, pp. 1683-1685.

(Continued)

*Primary Examiner* — Mark Hellner
(74) *Attorney, Agent, or Firm* — Edell, Shapiro & Finnan, LLC (57) ABSTRACT

An optical fiber carries optical channels injected into the optical fiber to a Raman amplifier. A controller determines a static tilt associated with the channels in the fiber due to wavelength dependent losses. A photodiode measures a total power of the channels at an output of the Raman amplifier. The controller determines a dynamic tilt associated with channels in the fiber based in part on the measured total power. The dynamic tilt is induced by Stimulated Raman Scattering (SRS) in the fiber and varies as a function of a total power of the signals injected into the fiber. The controller determines a total tilt with which to offset the static and dynamic tilts. The controller sets an amplifier gain tilt applied to the channels equal to the total tilt.

21 Claims, 7 Drawing Sheets

(56) References Cited

U.S. PATENT DOCUMENTS

| | | | |
|---|---|---|---|
| 2003/0151799 A1* | 8/2003 | Wight | H01S 3/2383 359/334 |
| 2004/0052453 A1 | 3/2004 | Mao et al. | |
| 2008/0291529 A1* | 11/2008 | Onaka | H04B 10/296 359/334 |
| 2011/0013267 A1 | 1/2011 | Griseri et al. | |
| 2011/0141552 A1 | 6/2011 | Ghera et al. | |
| 2012/0307351 A1* | 12/2012 | Hiraizumi | H01S 3/06754 359/334 |

OTHER PUBLICATIONS

Kim, et al., "Semi-Analytic Gain Control Algorithm for the Fiber Raman Amplifier under Dynamic Channel Reconfiguration," Optical Fiber Communication Conference, Optical Society of America, Mar. 2005, 3 pages.

Zhang, et al., "Matrix Algorithms for Dynamic Gain-Spectrum Adjustment of Backward-Pumped Distributed Fiber Raman Amplifier," Journal of Lightwave Technology, vol. 24, No. 3, Mar. 2006, pp. 1581-1588.

* cited by examiner

| | | | TARGET TILT VALUES [dB] | | | | |
|---|---|---|---|---|---|---|---|
| | -2 | ... | 0 | 1 | ... | 2 | |
| 10 | | | | | | | |
| 11 | | | PUMP POWER VALUES [mW] | | | | |
| ... | | | | | | | |
| ... | | | | | | | |
| ... | | | | | | | |
| 20 | | | | | | | |
| TARGET GAIN VALUES [dB] | | | | | | | |

RAMAN-BASED STATIC AND DYNAMIC TILT CONTROL IN AN OPTICAL SYSTEM

TECHNICAL FIELD

The present disclosure relates to optical amplifier tilt control to compensate for undesired tilt in an optical system.

BACKGROUND

In a Dense Wavelength Division Multiplexed (DWDM) optical transmission system, optical performance may vary across the optical channels. The worst performing channels lead to a system performance bottle-neck. A main source of the channel performance unbalance is a channel power unbalance, or undesired tilt, of the optical channels in an optical fiber span that carries the optical channels from a transmit end to a receive end of the system. The channel power unbalance generates non-linear impairment unbalance in which channels having relatively higher power generate more impairment to neighboring channels and to themselves than do channels with relatively lower power. In addition, channel power unbalance causes unbalanced optical signal-to-noise ratios (OSNRs) at the receive end, where channels with lower power experience lower OSNRs than do channels input with higher power.

DESCRIPTION OF EXAMPLE EMBODIMENTS

Overview

A Raman amplifier amplifies optical channels delivered to the Raman amplifier by an optical fiber into which the optical channels are injected. A controller coupled to the Raman amplifier determines a static tilt associated with the optical channels in the optical fiber due to wavelength dependent losses. A photodetector coupled to the controller measures a total power of the optical channels at an output of the Raman amplifier. The controller determines a dynamic tilt associated with the optical channels in the optical fiber based in part on the measured total power, wherein the dynamic tilt is induced by Stimulated Raman Scattering (SRS) in the optical fiber and varies as a function of a total power of the optical signals injected into the optical fiber. The controller determines a total tilt with which to offset the static and dynamic tilts, and sets an amplifier gain tilt applied to the optical signals equal to the total tilt.

Example Embodiments

Figure 1:
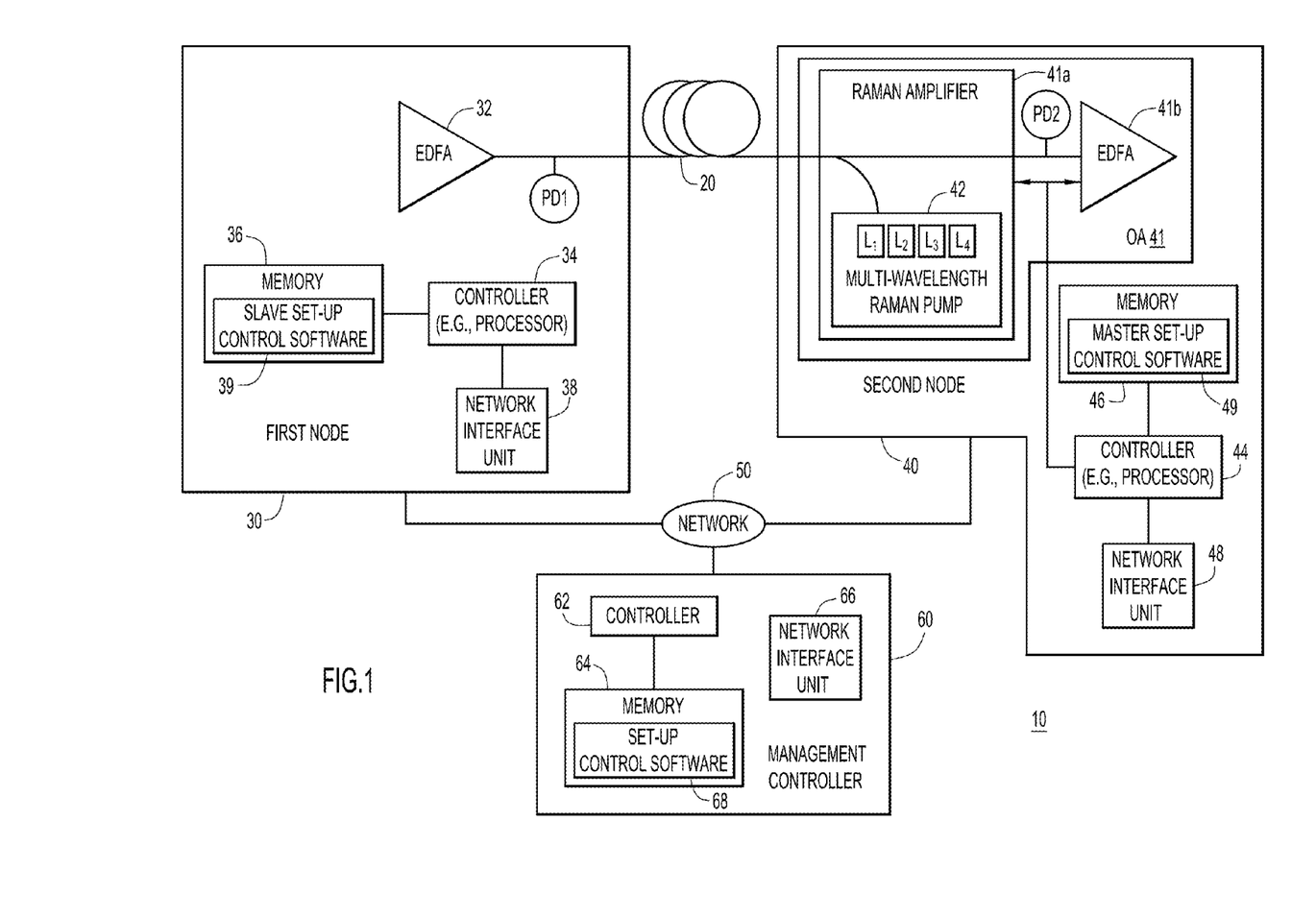
FIG. 1 is a block diagram of an optical transmission system in which tilt control embodiments may be implemented, according to an example embodiment.

Reference is first made to FIG. 1, which shows an optical transmission system 10 in connection with a span of an optical fiber 20 that extends between a first node 30 and a second node 40. In the example shown in FIG. 1, first node 30 is said to be at the input or transmit end of fiber 20 and second node 40 is said to be at an output or receive end. First node 30 transmits optical signals to second node 40 through fiber 20.

At first node 30, there is an Erbium Doped Fiber Amplifier (EDFA) 32 having an output coupled to an input end of optical fiber 20, a controller 34, memory 36 and a network interface unit 38. EDFA 32 may be a single wavelength controlled optical source, a Dense Wavelength Division Multiplexed (DWDM) controlled optical source that outputs a channel comb of a plurality of optical wavelengths or channels across an optical spectrum having an optical spectrum bandwidth, or a wideband optical source that outputs an optical signal in the wavelength range where amplification is required. First node 30 may also include a wideband photodiode PD1 to measure an optical power output by EDFA 32 and injected into optical fiber 20.

First node 30 includes a controller 34, which may be a microprocessor or microcontroller. In one example, controller 34 is a microprocessor that executes software instructions stored in a memory 36. For example, the memory 36 stores control software 39 used to control a gain and a tilt of EDFA 32. The network interface 38 enables network communications with second node 40, or with a controller entity described hereinafter, via network 50, e.g., an Internet Protocol (IP) or other Layer 3 network.

Second node 40 comprises an optical amplifier (OA) 41 following optical fiber 20. In the depicted embodiment, optical amplifier 41 includes multiple cascaded amplifier sections, including a Raman amplifier 41a having an amplifier input coupled to an output end of optical fiber 20 and an amplifier output coupled to an amplifier input of an EDFA 41b, which may be omitted in some embodiments Raman amplifier 41a includes a multi-wavelength Raman pump 42. Multi-wavelength Raman pump 42 includes a plurality of Raman pump lasers, for example, four lasers denoted $L_1$, $L_2$, $L_3$ and $L_4$. It should be understood that the Raman pump 42 may have fewer or more than four pump lasers, and that four is only an example. Multi-wavelength Raman pump 42 injects optical Raman pump power into the fiber 20 at a plurality of wavelengths according to the number of Raman pump lasers provided. A photodiode PD2 measures an optical signal power from the first node 30 in second node 40 at an output of Raman amplifier 41a through a tap coupler (not shown in FIG. 1 for simplicity). Photodiode PD2 may be a wideband photodiode and can measure a level of the optical signal across a wide range of wavelengths. Thus, photodiode PD2 measures a total power over the range of wavelengths.

Second node 40 also includes a controller 44, memory 46 and network interface unit 48. Controller 44 is, for example, a microprocessor or microcontroller, and executes software stored in memory 46. For example, memory 46 stores control software 49 that the controller 44 executes to control a gain and a tilt of Raman amplifier 41a and a gain and a tilt of EDFA 41b as described herein. The network interface unit 48 enables network communications on behalf of the second node 40.

First node 30 and second node 40 may engage in control plane communications with each other over network 50. Again, network 50 may be an IP-based network, and is meant to include local area networks and wide area networks.

It is to be understood that an actual deployed optical network has numerous nodes connected to each other by optical fibers. There are numerous optical fiber spans that may use distributed Raman and EDFA amplification and thus may employ the techniques presented herein. In addition, the first and second nodes shown in FIG. 1 may include additional components, but for simplicity those components are not shown as they do not relate to or participate in the tilt control techniques presented herein.

A management controller 60 performs management functions in the optical network. Management controller 60 communicates with all nodes in the optical network by way of network 50. The management controller 60 may be a computing apparatus, e.g., server blade or cloud application running in a data center. FIG. 1 shows that the management controller 60 includes a controller (e.g., one or more processors) 62, memory 64 and a network interface unit 66. The network interface unit 66 enables network communications over network 50 with the first node 30 and second node 40. Controller 62 executes control software 68 stored in memory 64 to perform operations described hereinafter related to tilt control. It is understood that nodes 30 and 40 may communicate directly with each without involving management controller 60. It is also understood that all or some of control software 68 may be distributed among nodes 30 and 40, e.g., implemented in control software 39 and 49.

The memory 36 in first node 30, memory 46 in second node 40 and memory 64 in management controller 60 may comprise read only memory (ROM), random access memory (RAM), magnetic disk storage media devices, optical storage media devices, flash memory devices, electrical, optical, or other physical/tangible memory storage devices. In general, these memories may comprise one or more tangible (non-transitory) computer readable storage media (e.g., a memory device) encoded with software comprising computer executable instructions and when the software instructions are executed by a processor (e.g., by the controller 34, controller 44 and processor 64, respectively) the processor is operable to perform the operations described herein. That is, the controller 44 of second node 40 is operable to obtain power measurements from PD2, cooperate with controller 62 to determine an undesired total tilt in optical fiber 20 based on the power measurements, and then control the tilts of one or more of Raman amplifier 41a and EDFA amplifier 41b. Alternatively, or in addition, controller 62 may cooperate with controller 34 in node 30 to control the tilt of EDFA 32 to offset the undesired total tilt.

In an optical transmission system, such as optical transmission system 10 in FIG. 1, it is desirable that the transmitted optical channels maintain a controlled spectrum shape (which may be flat in one example, but may have other controlled shapes that are not flat) such that the powers of the optical channels are matching the optimum power (i.e. to maximize performance); however, many factors may cause or introduce an undesired power unbalance or tilt of the power spectrum. In system 10, sources of undesired tilt may be both static and dynamic. Sources of static tilt include, for example: a gain tilt of EDFA 32, which introduces a tilt across the optical channels delivered from the EDFA; wavelength dependent loss (WDL) due to optical fiber 20 and other associated optical components, such as filters, couplers, and the like; and optical amplifier noise figure wavelength dependence.

On the other hand, a source of dynamic tilt includes intra-channel Stimulated Raman Scattering (SRS) in optical fiber 20, which induces SRS tilt among/across the optical channels. The SRS tilt induced by fiber 20 varies as a function of an aggregated or total power of the optical channels injected into and carried by the fiber. The total power of the optical channels carried in fiber 20 may abruptly and unpredictably change due to, for example, a fiber cut. Consequently, the SRS tilt (i.e., the dynamic tilt) introduced by fiber 10 may abruptly and unpredictably change.

Accordingly, tilt control embodiments presented herein provide fast-response tilt control to compensate for offset such SRS tilt associated with the optical channels in fiber 20, and thereby help to maintain the desired optical channel power spectrum. One tilt control embodiment provides fast control of a gain tilt (also referred to as simply "tilt") of Raman amplifier 41a to offset or compensate for, and thus minimize, the undesired tilt. Raman gain tilt control compensates for both undesired static and dynamic tilt. This embodiment uses fast control of the pump powers of Raman pumps 42 to achieve the fast control of the tilt of Raman amplifier 41a. As a result, Raman amplifier 41a outputs the optical channels compensating for all of the undesired tilt source across all of the channels. An advantage of controlling the Raman pump powers is their fast response time, which is fast enough to compensate for fast dynamic transients due to fast optical power variations in optical fiber 20. Another advantage is that the tilt control is implemented at the receive end of optical fiber 20 (i.e., in node 40), which removes channel unbalance in non-linear transmission effects. Another tilt control embodiment provides fast control of a gain tilt (i.e., "tilt") of EDFA amplifier 41b. Yet another tilt control embodiment provides fast control of the tilt of Raman amplifier 41a and the tilt of EDFA 41b in combination to counteract the SRS tilt. An even further tilt control embodiment provides fast control of the tilt of EDFA 32 in node 30.

Figure 2A:
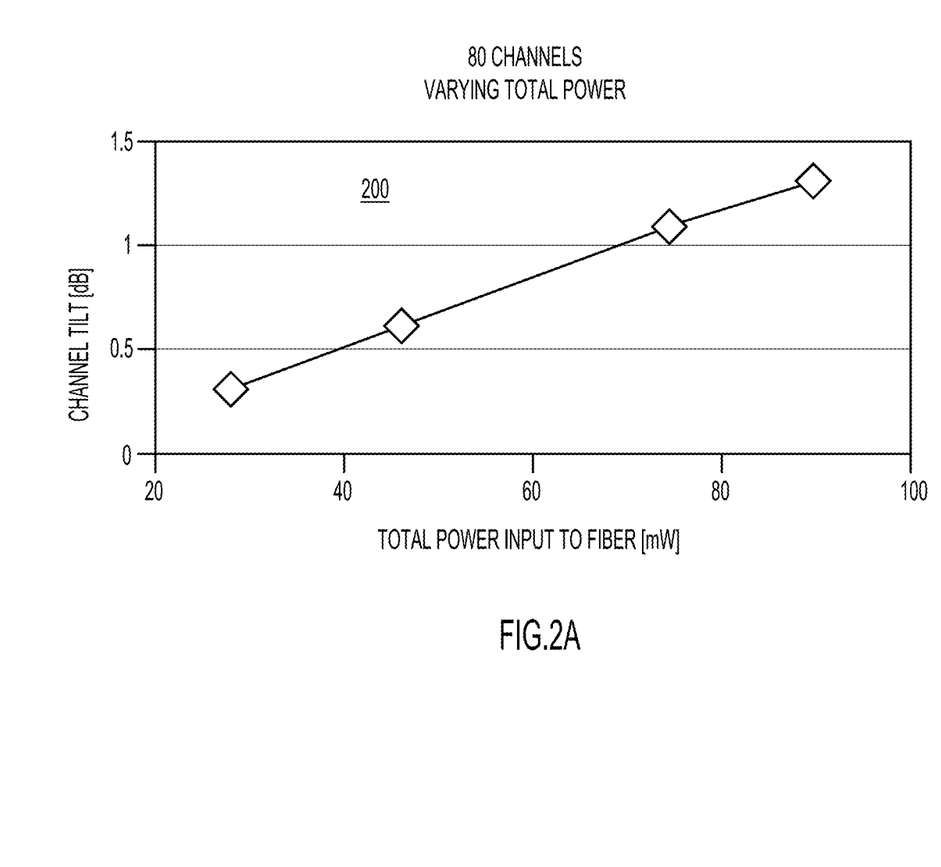
FIG. 2A is a plot of an example channel tilt due to Stimulated Raman Scattering (SRS) across optical channels carried in an optical fiber vs. a total power of the channels injected into the optical fiber.

The tilt control embodiments take advantage of the fact that the SRS tilt associated with optical channels in an optical fiber linearly depends on a total power of the optical channels injected into the optical fiber, as depicted in FIG. 2A. FIG. 2A is an example plot 200 of channel tilt (i.e., SRS tilt) across 80 optical channels carried in an optical fiber vs. a total power of the channels injected into the optical fiber.

Figure 2B:
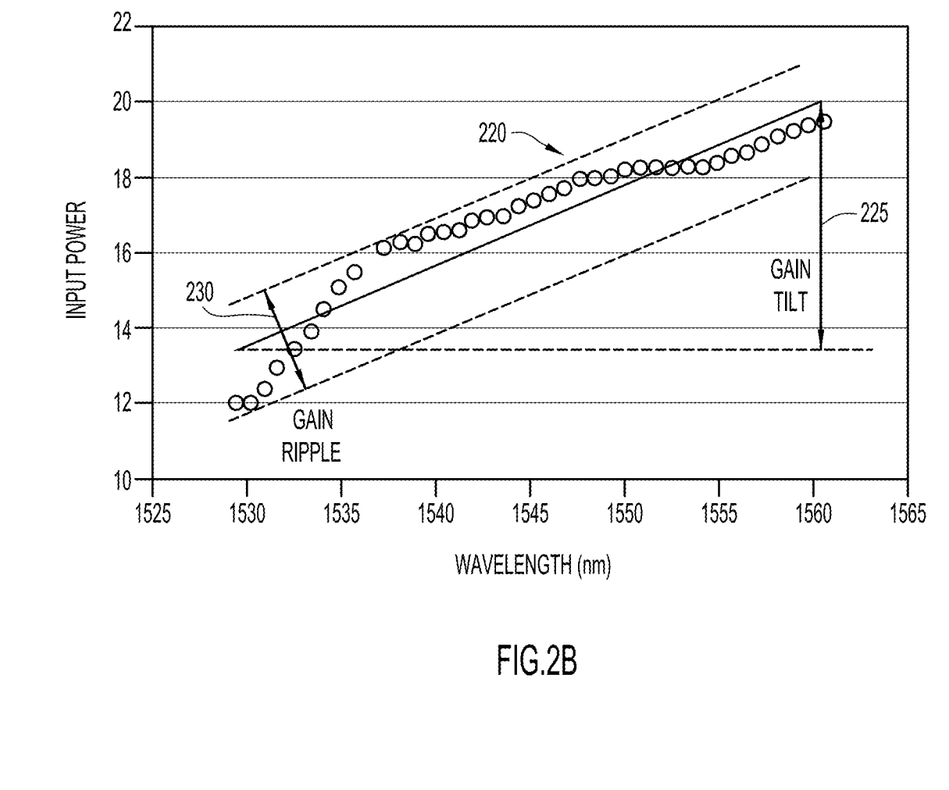
FIG. 2B is a plot of a gain profile referenced to an output of a given optical amplifier, which may be a Raman amplifier or an Erbium Doped Fiber Amplifier (EDFA).

The tilt control embodiments also take advantage of the fact that a given optical amplifier, whether Raman amplifier 41a, EDFA 41b, or EDFA 32, has a controllable gain tilt. Specifically, the tilt control embodiments operate to control the amplifier gain tilt in order to offset or compensate for (e.g., cancel) the undesired SRS tilt introduced by optical fiber 20, as well as static tilt. With reference to FIG. 2B, there is a plot of an example gain profile 220 referenced to an output of a given optical amplifier, which may be a Raman amplifier or an EDFA. Gain profile 220 represents a gain spectrum (or power spectrum) measured at an output of the given amplifier. Gain profile 220 has a gain tilt 225 defined as a slope of the gain profile multiplied by a spectral width (e.g., 32 nm) of the gain profile. The slope may be determined as a linear least squares fit of gain profile 220. Gain profile 220 also includes a gain ripple 230 defined as a maximum peak-to-peak deviation of the gain profile from the linear fit.

Figure 3:
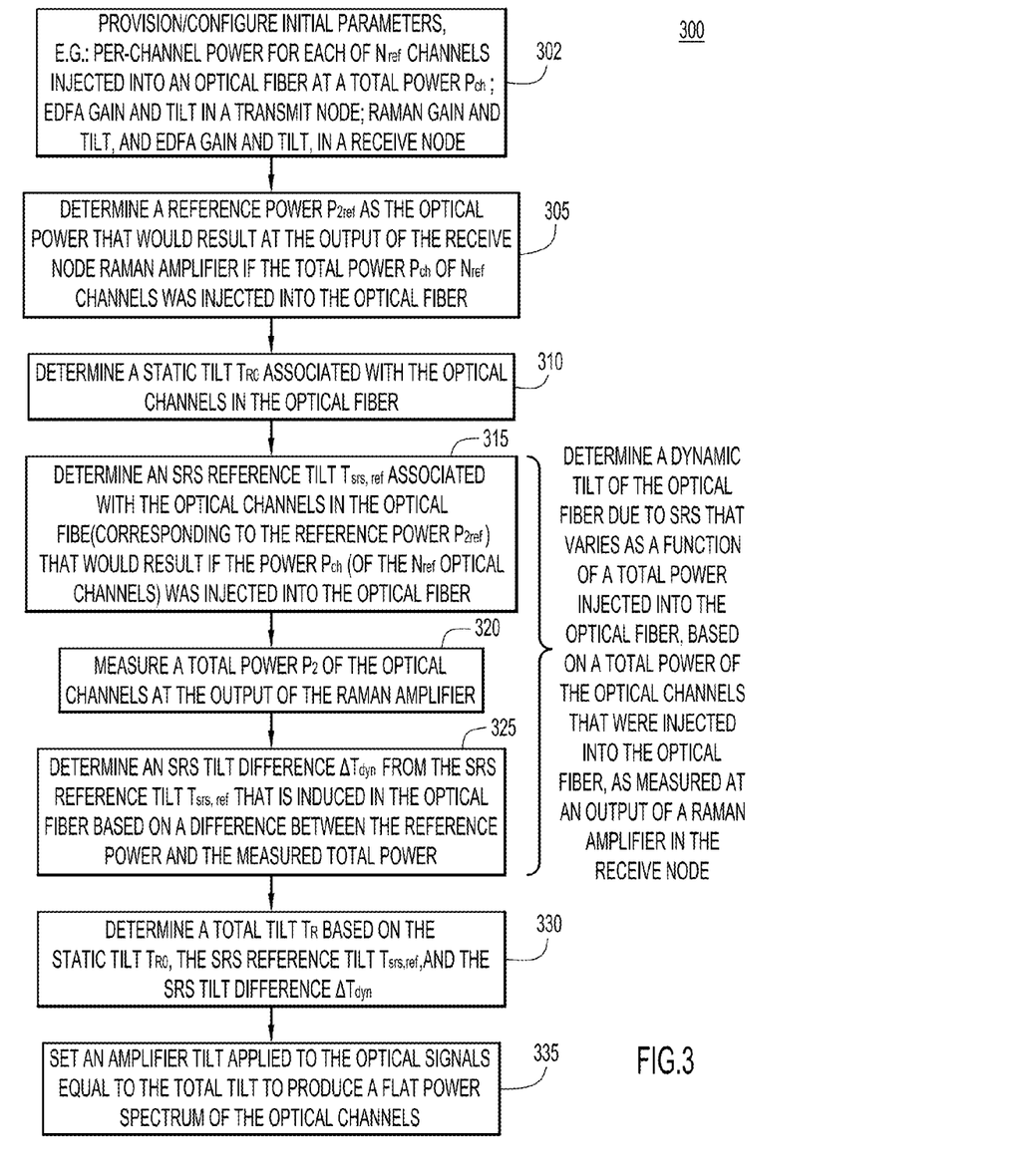
FIG. 3 is a flowchart of a method of controlling tilt to compensate for static and dynamic tilt performed in the system of FIG. 1, according to an example embodiment.

With reference to FIG. 3, there is depicted a flowchart of a method 300 for controlling amplifier tilt applied to optical channels to compensate for undesired static and dynamic tilt, performed in system 10. Reference is also made to FIG. 1 for purposes of the description of FIG. 3.

At 302, management controller 60 sends commands to first node 30 and to second node 40 to provision/configure the following parameters in the first and second nodes: a per-channel power for each of a given number $N_{ref}$ of optical channels at the output of EDFA 32, which results in a total power $P_{ch}$ (e.g., an aggregated DWDM optical power $P_{ch}$) at the output of the EDFA; the tilt of EDFA 32, the gain and tilt of Raman amplifier 41a; and the gain and tilt of EDFA amplifier 41b. The aforementioned parameters are provisioned to fulfill a predetermined optimization criteria, such as a highest OSNR, a lowest BER, and the like.

Also, values for a length, a type, and an insertion loss of optical fiber 20 are stored in memory 64 of management controller 60. This fiber information may have been collected from specifications of the fiber, or may be derived from direct measurement during an initial calibration or setup of system 10.

At 305, a reference power $P_{2ref}$ (e.g., an aggregated DWDM optical power) at the output of Raman amplifier 41a is determined; reference power $P_{2ref}$ is the optical power that would appear/result at the output of Raman amplifier 41a if the total power $P_{ch}$ of the number $N_{ref}$ of channels was injected into optical fiber 20 at node 30. Thus, reference power $P_{2ref}$ corresponds to or is indicative of the total power $P_{ch}$. In a specific case of equalized channels, reference power $P_{2ref}$ may be determined according to the following equation: $P_{2ref} = P_{ch} - (\text{loss of fiber } 20) + G_R$, where power $P_{ch}$, loss, and gain $G_r$ (a gain of Raman amplifier 41a), may be in any suitable units, such as in dBm or dB. Reference power $P_{2ref}$ may also be expressed in terms of an average power $P_{ch-avg}$ at the output of EDFA 32 instead of total power $P_{ch}$, as follows: $P_{2ref} = 10 \times \log 10(N_{ref}) + P_{ch-avg} - (\text{loss of fiber } 20) + G_R$. The methods described herein may use reference power $P_{2ref}$ expressed in terms of either total power $P_{ch}$ or average power $P_{ch-avg}$.

At 310, a static tilt $T_{R0}$ is determined. Static tilt $T_{R0}$ includes tilt introduced by the tilt of EDFA 32, the tilt introduced by any device or fiber preceding the EDFA 32 and the tilt introduced by the WDL of optical fiber 20 and its related optical components. Assuming that the initial provisioning at 302 eliminated the gain tilt from EDFA 32 and any device or fiber preceding the EDFA 32 so that the EDFA 32 would inject the optical channels into optical fiber 20 with a flat channel spectrum across the optical channels, then static tilt $T_{R0}$ associated with the optical channels carried in optical fiber 20 mainly results from the WDL of the fiber. In an example in which optical fiber 20 is an 80 km-long single-mode fiber (SMF) optical fiber, the WDL contribution to tilt at the end of the optical fiber is 0.36 dB across 32 nm. Thus, in the example, $T_{R0} = -0.36$ dB.

At next operations 315-325, collectively represented at 312, a dynamic tilt of the optical channels due to SRS in optical fiber 20, that varies as a function of a total power injected into the optical fiber, is determined based on a total power of the optical channels measured at photodiode PD2 (at the output of Raman amplifier 41a). The measured total power at the output of Raman amplifier 41a is indicative of the total power that was injected into optical fiber 20 by node 30. Operations 315-325 that determine the dynamic tilt are now described.

At 315, an SRS reference tilt $T_{srs,ref}$ associated with the optical channels in optical fiber 20 corresponding to reference power $P_{2ref}$ is determined; SRS reference tilt $T_{srs,ref}$ is the tilt that optical fiber 20 would introduce due to SRS if the total power $P_{ch}$ of the number $N_{ref}$ of channels was injected into optical fiber 20. Optical fiber 20 introduces SRS tilt $T_{srs}$ such that the tilt varies linearly with a total power $P_1$ actually input to the fiber according to the equation:

$$T_{srs} = c_{fibre} \times P_1, (T_{srs} \text{ in dB}, P_1 \text{ in milliWatts (mW)}),$$

where $c_{fibre}$ is a constant having units dB/mW/km.

Accordingly, SRS reference tilt $T_{srs,ref}$ introduced by optical fiber 20 that would result if total power $P_{ch}$ of the number of optical channels $N_{ref}$ was injected into the fiber is given by the equation:

$$T_{srs,ref} = c_{fibre} \times N_{ref} \times P_{ch}.$$

Node 30 injects the optical channels into optical fiber 20. Over time, the total power and number of channels injected into optical fiber 20 may vary, e.g., may become greater or less than the provisioned power $P_{ch}$ (and number $N_{ref}$ of channels). As the optical input to optical fiber 20 varies over time, the SRS tilt associated with the optical channels that is induced by the optical fiber varies correspondingly.

At 320, photodiode PD2 measures an actual total power $P_2$ at the output of Raman amplifier 41a.

At 325, an SRS tilt difference $\Delta T_{dyn}$ from SRS reference tilt $T_{srs,ref}$ that is induced in optical fiber 20 as a result of any power difference between reference power $P_{2ref}$ and measured total power $P_2$ is determined based on that power difference. As mentioned above, SRS tilt difference $\Delta T_{dyn}$ arises if the total power $P_1$ injected into optical fiber 20 deviates from total power $P_{ch}$ (of the $N_{ref}$ optical channels) which was used to determine reference tilt $T_{srs,ref}$. It is assumed that $P_2$ and $P_{2ref}$ are assumed to be related to the DWDM channel power only. As a matter of fact, however, photodiode PD2 in node 40 measures the DWDM channel power together with the ASE noise power generated by Raman amplifier 41a. Thus, the power measurement of PD2 may be corrected for the additional ASE power, which can be assumed to be roughly independent from the DWDM channel power.

Assuming that the difference between measured total power $P_2$ and reference power $P_{2Ref}$ at the output of Raman amplifier 41a represents a corresponding difference between total power $P_1$ actually injected into optical fiber 20 and total power $P_{ch}$ for the number $N_{ref}$ of channels, then tilt difference $\Delta T_{dyn}$, is given by the following equation:

$$\Delta T_{dyn} = c_{fibre}/L_s \times (P_2 - P_{2ref}),$$

where $L_s$ is the loss of optical fiber 20 such that $P_2 = L_s \times P_1$.

The dynamic tilt is based on both SRS reference tilt $T_{srs,ref}$ and SRS tilt difference $\Delta T_{dyn}$ according to the equation: Dynamic tilt $= \Delta T_{dyn} + T_{srs,ref}$.

At 330, a total amplifier gain tilt $T_R$ is determined, which is the total amplifier gain tilt needed to compensate for the static tilt and the dynamic tilt introduced by optical fiber 20. Total amplifier gain tilt $T_R$ is based on static tilt $T_{R0}$ determined at 310, SRS reference tilt $T_{srs,ref}$ determined at 315, and SRS tilt difference $\Delta T_{dyn}$ (if any) determined at 325 based on the power difference $P_2 - P_{2ref}$, according to the following equation:

$$T_R = T_{R0} - T_{srs,ref} - \Delta T_{dyn}.$$

In one embodiment, management controller 60 determines and provides to controller 44 of node 40 various coefficients in the equation for $T_R$, and then controller 44 calculates $T_R$ based on the received coefficients and measured total power $P_2$. For example, management controller 60 determines and provides to controller 44 the coefficients $T_{R0}$, $T_{srs,ref}$, and $c_{fibre}/L_s$, and then controller 44 calculates $T_R$.

In other embodiments, $T_R$ may be determined based on one or more predetermined/pre-computed look up tables having entries indexed by measured total power $P_2$ or a function of $P_2$, as described below in connection with FIGS. 4 and 5.

Figure 4:
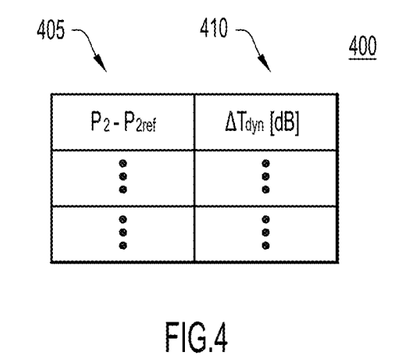
FIG. 4 is an illustration of a look up table for SRS tilt difference values used in the method of FIG. 3, according to an example embodiment.

With reference to FIG. 4, there is an illustration of an example look up table 400 having (i) a first column 405 that lists predetermined power differences between measured total power $P_2$ and reference power $P_{2ref}$ (i.e., $P_2-P_{2ref}$) over a range of $P_2$ values, and (ii) a second column 410 that lists predetermined SRS tilt differences $\Delta T_{dyn}$ corresponding to the predetermined differences $P_2-P_{2ref}$. In other words, each entry in look up table 400 maps a predetermined power difference $P_2-P_{2ref}$ to a corresponding predetermined SRS tilt difference $\Delta T_{dyn}$. Management controller 60 pre-computes look up table 400 (i.e., the entries of the look up table) and downloads the look up table to memory 46 associated with controller 44 of node 40, along with coefficients $T_{R0}$ and $T_{srs,ref}$, prior to power measurement operation 320. Then, at operation 325, controller 44 determines a power difference between a most recent measured total power $P_2$ and reference power $P_{2ref}$ (i.e., determines $P_2-P_{2ref}$), and retrieves a predetermined SRS tilt difference $\Delta T_{dyn}$ based on the determined power difference, i.e., using the determined power difference as an index into look up table 400. For example, controller 44 retrieves the predetermined SRS tilt difference $\Delta T_{dyn}$ corresponding to the predetermined power difference in look up table 400 that is closest to the determined power difference. Then, at 330, controller 44 determines $T_R$ using the retrieved, predetermined SRS tilt difference $\Delta T_{dyn}$ and the other downloaded coefficients $T_{R0}$ and $T_{srs,ref}$.

Figure 5:
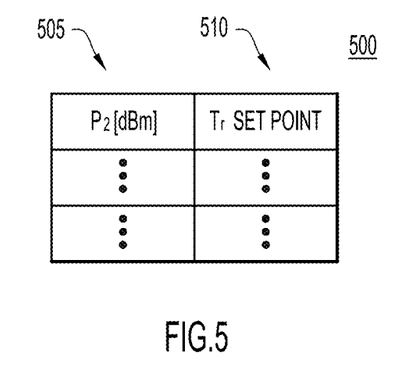
FIG. 5 is an illustration of a look up table for total tilt values used in the method of FIG. 3, according to an example embodiment.

With reference to FIG. 5, there is an illustration of an another example look up table 500 having (i) a first column 505 that lists predetermined total power measurements $P_2$ over a range of $P_2$ values, and (ii) a second column 510 that lists predetermined total tilts $T_R$ corresponding to the predetermined total power measurements $P_2$ (also referred to as predetermined measured total power). In other words, each entry in look up table 500 maps a predetermined total power measurement $P_2$ to a corresponding total tilt $T_R$. Management controller pre-computes look up table 500 and downloads the look up table to controller 44 of node 40 prior to power measurement operation 320. Then, at operation 330, controller 44 retrieves a predetermined total tilt $T_R$ based on the measured total power $P_2$. For example, controller 44 retrieves the predetermined total tilt $T_R$ corresponding to the predetermined measured total power in look up table 500 that is closest to the (actual) measured total power $P_2$.

Returning to FIG. 3, after total tilt $T_R$ is determined, at 335, an amplifier gain tilt is set equal to total tilt $T_R$ and the amplifier gain tilt is applied to the optical channels so as to offset or compensate for the undesired (static and dynamic) tilt. The controlled tilt may or may not result in a flat channel spectrum shape. The amplifier gain tilt is controlled in any of a variety of different ways, mentioned below.

In one embodiment, the gain tilt of Raman amplifier 41a is set equal to total tilt $T_R$ controlled to offset the total tilt. To do this, controller 44 sets pump powers P1-P4 of Raman pumps L1-L4 to cause the gain tilt of Raman amplifier 41a to be equal to total tilt $T_R$, such that the optical power spectrum of the optical channels output from the Raman amplifier has a controlled shape, which may be substantially flat, or may not be substantially flat. Any known or hereafter developed technique may be used to set the gain tilt of Raman amplifier 41a to $T_R$, as would be appreciated by one of ordinary skill in the relevant arts having read the present description. In one example, controller 44 retrieves the pump powers P1-P4 from predetermined look up tables based on determined total tilt $T_R$ and then controls Raman pump 42 accordingly, i.e., sets the pump powers to values equal to the retrieved pump values. Typically, one look up table is provided for each Raman pump (wavelength), as depicted in FIG. 6.

Figure 6:
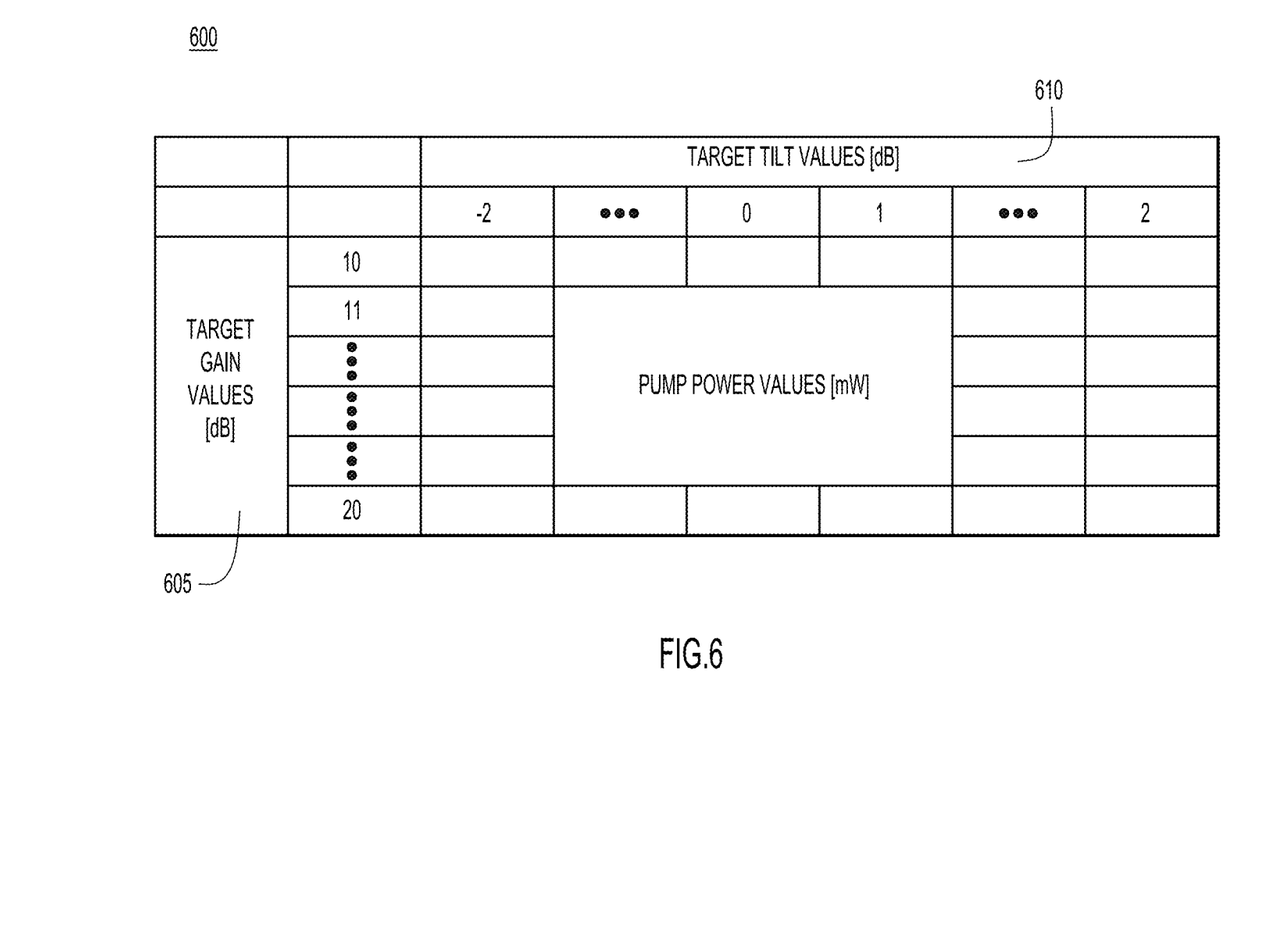
FIG. 6 is an illustration of a pump power look up table for one Raman pump (wavelength) used to control gain and tilt of a Raman amplifier in the system of FIG. 1, according to an example embodiment.

With reference to FIG. 6, there is an illustration of an example pump power look up table 600 for one Raman pump (wavelength). In look up table 600, rows 605 correspond to gain levels and columns 610 to tilt levels: each value in the look up table is the power required for the individual pump in order to achieve a target Gain and tilt. Pump power look up table 600 (and the look up tables for the other Raman pumps) is filled by a calibration procedure. When a couple (gain, tilt) is provided to the controller 44, the controller scans columns 610 and rows 605 in look up table 600 to find nearest values for gain tilt and gain and thus a row, column coordinate. The cell value stored at the found row, column is the required power level for that individual pump.

In another embodiment, a gain tilt of EDFA 41b is set equal to the total tilt. To do this, controller 45 sets a variable optical attenuator (VOA) of EDFA 41b to an attenuation setting that establishes the gain tilt of the EDFA to offset the total tilt, as will be described below in connection with FIG. 7. As a result, EDFA 41b outputs the optical channels such that the optical power spectrum thereof is substantially flat in one embodiment.

In another embodiment, the gain tilt of Raman amplifier 41a and the gain tilt of EDFA 41b are both controlled as described above so that the combined controlled gain tilts of the cascaded amplifiers produce the total tilt ($T_R$). In other words, the total tilt is shared between the tilts of Raman amplifier 41a and EDFA amplifier 41b.

In another embodiment, the gain tilt of EDFA 32 is set equal to the total tilt. To do this, controller 45 sets a VOA of EDFA 32 to an attenuation setting that establishes the gain tilt of the EDFA to offset the total tilt. As a result, EDFA 32 outputs the optical channels such that the optical power spectrum thereof is pre-tilted to offset the undesired total tilt introduced by optical fiber 20.

Examples of method 300 are now described using real world parameters and coefficient values, as well as examples of look up tables 400 and 500.

Assume optical fiber 20 is made of SMF-28 fiber, and is 80 km long with 20 dB of loss. Also, assume provisioning/initial configuring operation 302 establishes $N_{ref}=10$, $P_{ch}=0$ dBm, and $G_R=10$ dB. Based on these assumptions, operation 305 determines $P_{2ref}=-10$ dBm or 0.1 mW.

Also assume an optimization criterion for system 10 to achieve a flat channel power spectrum at the output of each optical amplifier (amplifiers 32, 41a, 41b) in the system. Thus a flat DWDM spectrum is assumed at the input end of optical fiber 20, and $T_{R0}$ must compensate only for the fiber WDL. Given the 80 km-long SMF fiber span, an estimated WDL contribution to channel tilt (static tilt) at the end of optical fiber 20 is equal to 0.36 dB over 32 nm.

Thus, operation 310 determines that $T_{R0}=-0.36$ dB.

For different optical fiber types, approximate values for $c_{fibre}$ are measured and tabulated as shown below in Table 1:

TABLE 1

| Fibre Type | $c_{fibre}$ [dB/mW/km] |
|---|---|
| E-LEAF | 1.15E−02 |
| SMF | 9.69E−03 |
| TW-RS | 1.33E−02 |

Thus, a span loss of 20 dB of SMF gives: $c_{fibre}/L_s$=0.969 [dB/mW/km].

Assuming that $P_{2ref}$=0.1 mW (e.g., using $N_{ref}$=10 and $P_{ch}$=0 dBm), the following example look up table (Table 2) for $\Delta T_{dyn}$ corresponding to look up table 400 in FIG. 4 may be pre-computed and provided to controller 44:

TABLE 2

| P2-P2ref [mW] | $\Delta T_{dyn}$ [dB] |
|---|---|
| −0.10 | −0.10 |
| 0.00 | 0.00 |
| 0.10 | 0.10 |
| 0.20 | 0.20 |
| 0.30 | 0.29 |
| 0.40 | 0.39 |
| 0.50 | 0.49 |
| 0.60 | 0.59 |
| 0.70 | 0.69 |
| 0.80 | 0.78 |
| 0.90 | 0.88 |
| 1.00 | 0.98 |
| 1.10 | 1.08 |

Also, $T_{srs,ref}$ is determined to be equal to 0.09 dB.

Alternatively, assuming $T_{R0}$=−0.36 and $T_{srs,ref}$=0.09 dB, the following example look up table (Table 3) for total tilt $T_R$ corresponding to look up table 500 in FIG. 5 may be pre-computed and provided to controller 44:

TABLE 5

| P2 [dBm] | $T_R$ |
|---|---|
| −30 | −0.36 |
| −28 | −0.36 |
| −26 | −0.36 |
| −24 | −0.37 |
| −22 | −0.37 |
| −20 | −0.37 |
| −18 | −0.38 |
| −16 | −0.39 |
| −14 | −0.40 |
| −12 | −0.42 |
| −10 | −0.46 |
| −8 | −0.52 |
| −6 | −0.61 |
| −4 | −0.75 |
| −2 | −0.98 |
| 0 | −1.34 |
| 2 | −1.92 |

Assume that initially, e.g., on a first day of operation of system 10, only 1 channel of the number $N_{ref}$ of channels is present (i.e., actually injected into the input of optical fiber 20), thus $P_2$=−20 dBm (or 0.01 mW). Then, controller 44 determines a total tilt $T_R$ in either of the following ways:

(i) Controller 44 determines $P_2-P_{2ref}$=−0.1 mW, and then retrieves from Table 2 a corresponding predetermined difference tilt $\Delta T_{dyn}$=−0.1 dB. Based on the retrieved $\Delta T_{dyn}$, controller 44 determines a total $T_R$ as −0.36−0.09+0.1=−0.36 dB; or (ii) Controller 44 accesses measured total power $P_2$=−20 dBm, and then retrieves from Table 3 a corresponding predetermined total $T_R$=−0.37 dB.

The difference between $T_R$ from (i) and (ii) above is due to numerical inaccuracy.

Assume that, over time, the number of channels increases from 1 to 20. Thus the measured total power $P_2$ read by photodiode PD2 increases to $P_2$=−7 dBm. Then, controller 44 determines a new total tilt $T_R$, in either of the following ways:

(i) Controller 44 determines $P_2-P_{2ref}$=+0.1 mW. Controller 44 retrieves from Table 2 a predetermined difference tilt $\Delta T_{dyn}$=+0.1 dB. Based on the retrieved $\Delta T_{dyn}$, controller 44 determines a total tilt $T_R$ as −0.36−0.09−0.1=−0.56 dB; or (ii) Controller 44 accesses measured total power P2=−7 dBm, and then retrieves from Table 3 a predetermined total tilt $T_R$=−0.56 dB.

Figure 7:
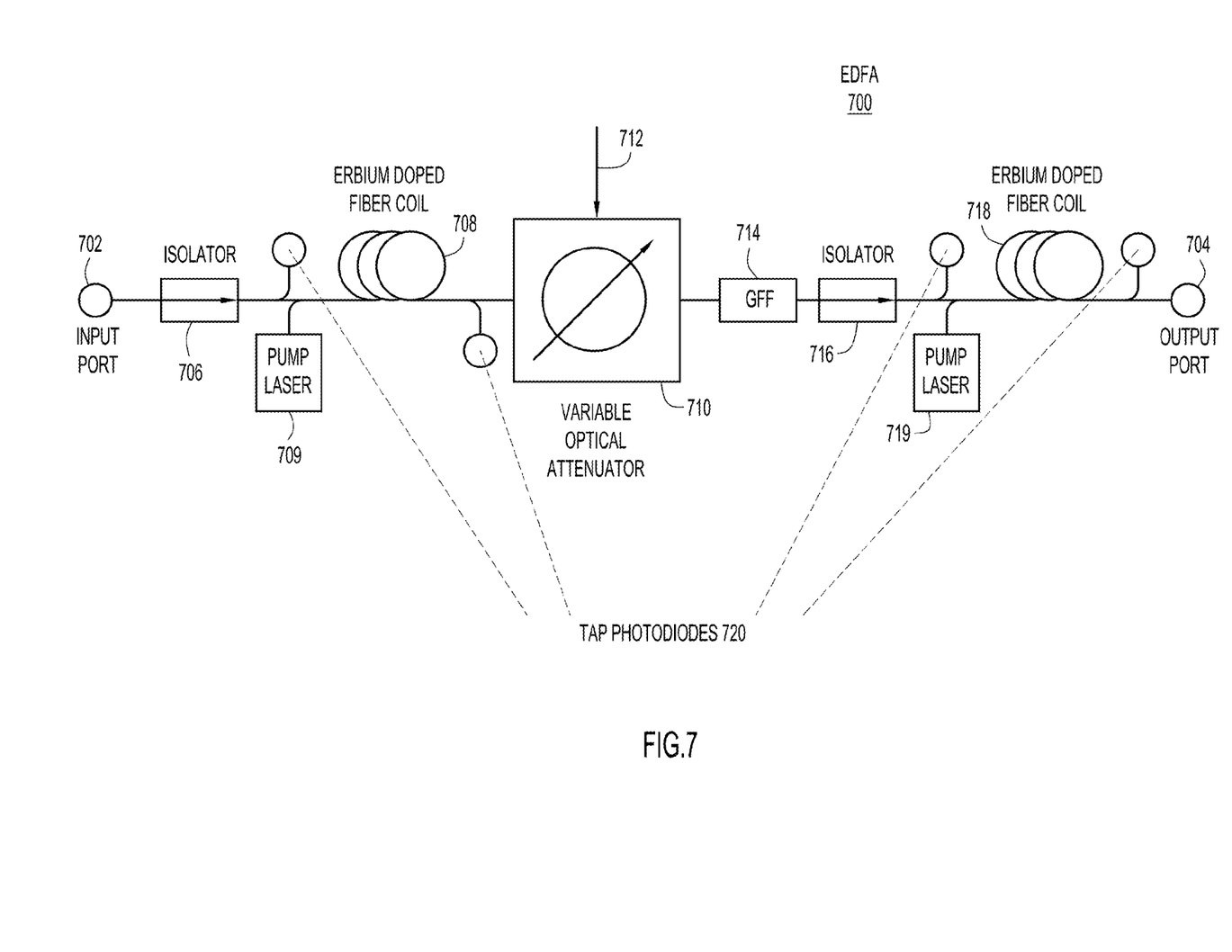
FIG. 7 is a block diagram of an EDFA that may be used in the system of FIG. 1, according to an example embodiment.

As mentioned above, certain tilt control embodiments may control gain tilt in either of EDFAs 32 and 41b to achieve tilt compensation. With reference to FIG. 7, there is a block diagram of an example EDFA 700 representative of both EDFA 32 and EDFA 41b following Raman amplifier 41a. EDFA 700 includes a plurality of optical signal processing blocks coupled between an input port 702 and an output port 704 that operate sequentially on an optical signal that is injected into the input port, including: an isolator 706, a first Erbium doped fiber coil 708 that is pumped by a first pump laser 709, a variable optical attenuator (VOA) 710 that introduces an attenuation responsive to a control signal 712, a gain flattening filter (GFF) 714, an isolator 716, and a second Erbium doped fiber coil 718 that is pumped by a second pump laser 719.

EDFA 700 also includes a series of tapped photodiodes 720 interspersed among the plurality of optical components listed above. Tapped photodiodes 720 measure gains of the two fiber stages individually and a total gain of EDFA 700, and also measure an output power delivered by the EDFA. Those measurements are used as feedback for controller 34, which sets pump powers of pump lasers 709 and 719, and provides control signal 719 to VOA to set the attenuation of the VOA so as set a desired gain and gain tilt of EDFA 700.

Other arrangements for EDFA 700 are possible, including arrangements having more than two fiber coils, more monitoring photodiodes, more pump lasers, and use of pump lasers in a counter-propagating configuration. VOA technologies that may be used for VOA 710 include MEMs, Magneto-optics, Acousto-optics, LiNbO-based (Mach Zehnder), and Semiconductor Based Electro-Absorption.

In tilt control embodiments that determine a total tilt or a shared total tilt to be applied by EDFA 41b (or EDFA 32) (e.g., as represented by EDFA 700), operations similar to those described above in connection with method 300 may be applied.

A static tilt $T_{A0}$ is determined in a manner similar to the way in which static tilt $T_{R0}$ is determined at operation 310.

The dependence of intra-channel tilt (the dynamic tilt) in optical fiber 20 due to SRS is as described above at operations 315-325.

Accordingly, a total tilt $T_A$ to be provided by the gain tilt of EDFA 41b (or EDFA 32) in order to compensate for the static and dynamic tilt is given by the equation: $T_A = T_{A0} - T_{srs,ref} - \Delta T_{dyn}$.

Assuming suitable look up tables have been provisioned to controller 44 as described above, controller 44 monitors the total power measured by photodetector PD2 and sets the gain tilt of EDFA 41b (or EDFA 32) accordingly, based on the measured total power and look up tables. The gain and gain tilt of EDFA 41b (or EDFA 32) is driven by a mechanism different from that in Raman amplifier 41a, and involves setting the attenuation of the VOA (e.g., VOA 710) and pump powers of the pump lasers (e.g., pump lasers 709 and 719) in the EDFA. This may be accomplished using any known or hereafter developed technique, as would be appreciated by one of ordinary skill in the relevant arts having reviewed the present description. In other tilt control embodiments, the total tilt needed to offset the static tilt and dynamic tilt due to SRS may be shared between the gain tilts in Raman amplifier 41a and one or both of EDFAs 41b and 32. For example, half of the total tilt may be implemented in Raman amplifier 41a while the other half is implemented in EDFA 41b, and so on.

In summary, embodiments presented herein provide an effective, highly responsive way to control fast unbalance variations across optical channels caused by fast transients of aggregated channel power, and enhance DWDM optical system performance by reducing the channel unbalance both in terms of OSNR and nonlinear impairments. In one embodiment, fast Raman amplifier tilt control is used to achieve a fast control of the unbalance. In this embodiment, the unbalance control is achieved by changing a drive current to multi-wavelength Raman pump of the Raman amplifier based on power measurements at a single photodiode and according to a closed formula or a lookup table. This approach can be extremely fast. In another embodiment, tilt control of an EDFA is used, the response time of which is limited by a VOA response time in the EDFA and by an intrinsic response time of an Erbium Doped fiber coil also in the EDFA.

In one form, a method is provided comprising: for an optical fiber that carries optical channels injected into an input end of the optical fiber and a Raman amplifier coupled to an output end of the optical fiber that amplifies the optical channels delivered from the output end of the fiber: determining a static tilt associated with the optical channels in the optical fiber due to wavelength dependent losses; measuring a total power of the optical channels at an output of the Raman amplifier; determining a dynamic tilt associated with the optical channels in the optical fiber based in part on the measured total power, wherein the dynamic tilt is induced by Stimulated Raman Scattering (SRS) in the optical fiber and varies as a function of a total power of the optical signals injected into the optical fiber; determining a total tilt with which to offset the static tilt and dynamic tilt; and setting an amplifier gain tilt applied to the optical signals equal to the total tilt.

In another form, an apparatus is provided comprising: a Raman amplifier to amplify optical channels delivered to the Raman amplifier by an output end of an optical fiber having an input end into which the optical channels are injected; a photodiode following the Raman amplifier to measure a total power of the optical channels at an output of the Raman amplifier; a network interface to communicate with a network; and a controller coupled to the Raman amplifier, the photodiode, and the network interface, to: determine a static tilt associated with the optical channels in the optical fiber due to wavelength dependent losses or gain of preceding devices; measure a total power of the optical channels at the output of the Raman amplifier; determine a dynamic tilt associated with the optical channels in the optical fiber based in part on the measured total power, wherein the dynamic tilt is induced by Stimulated Raman Scattering (SRS) in the optical fiber and varies as a function of a total power of the optical signals injected into the optical fiber; determine a total tilt with which to offset the static tilt and dynamic tilt; and set an amplifier gain tilt applied to the optical signals equal to the total tilt.

In yet another form, a computer readable storage media encoded with instructions is provided. The instructions, when executed by a processor of an optical receive node including a Raman amplifier to amplify optical channels delivered to the Raman amplifier by an output end of an optical fiber having an input end into which the optical channels are injected, a photodiode to measure a total power of the optical channels at the output of the Raman amplifier, and a network interface to communicate with a network, cause the processor to: determine a static tilt associated with the optical channels in the optical fiber due to wavelength dependent losses; measure a total power of the optical channels at the output of the Raman amplifier; determine a dynamic tilt associated with the optical channels in the optical fiber based in part on the measured total power, wherein the dynamic tilt is induced by Stimulated Raman Scattering (SRS) in the optical fiber and varies as a function of a total power of the optical signals injected into the optical fiber; determine a total tilt with which to offset the static tilt and dynamic tilt; and set an amplifier gain tilt applied to the optical signals equal to the total tilt.

While the techniques illustrated and described herein are embodied in one or more specific examples, it is nevertheless not intended to be limited to the details shown, since various modifications and structural changes may be made therein without departing from the scope and range of equivalents of the claims.

What is claimed is:

1. A method comprising:
   for an optical fiber that carries optical channels injected into an input end of the optical fiber and a Raman amplifier coupled to an output end of the optical fiber that amplifies the optical channels delivered from the output end of the fiber:
      determining a static tilt associated with the optical channels in the optical fiber due to wavelength dependent losses;
      measuring a total power of the optical channels at an output of the Raman amplifier;
      determining a dynamic tilt associated with the optical channels in the optical fiber based in part on the measured total power, wherein the dynamic tilt is induced by Stimulated Raman Scattering (SRS) in the optical fiber and varies as a function of a total power of the optical signals injected into the optical fiber;
      determining a total tilt with which to offset the static tilt and dynamic tilt; and
      setting an amplifier gain tilt applied to the optical signals equal to the total tilt.

2. The method of claim 1, wherein:
   the determining the dynamic tilt includes:
      determining an SRS reference tilt associated with the optical channels in the optical fiber and a corresponding reference power at the output of the Raman amplifier that would each result if a predetermined total input power and number of the optical channels were injected into the optical fiber with the Raman amplifier set to a predetermined gain; and
      determining an SRS tilt difference from the SRS reference tilt that is induced in the optical fiber based on a difference between the reference power and the measured total power; and the determining a total tilt includes determining the total tilt based on the static tilt, the SRS reference tilt, and the SRS tilt difference.

3. The method of claim 2, wherein the determining a total tilt includes calculating the total tilt, $T_R$, according to the following equation: $T_R = T_{R0} - T_{srs,ref} - \Delta T_{dyn}$, where:
   (i) $T_{R0}$ is the static tilt;
   (ii) $T_{srs,ref}$ is the SRS reference tilt, where $T_{srs,ref} = c_{fibre} \times N_{ref} \times P_{ch}$, where
      $c_{fibre}$ is a constant dependent on a type of fiber in the fiber span,
      $N_{ref}$ is the predetermined number of optical channels,
      $P_{ch}$ is the predetermined channel input power; and
   (iii) $\Delta T_{dyn}$ is the SRS difference tilt, where $\Delta T_{dyn} = c_{fibre} / L_s \times (P_2 - P_{2ref})$, and
      $L_s$ is a length of the fiber span,
      $P_2$ is the measured total output power, and
      $P_{2ref}$ is the reference power.

4. The method of claim 2, further comprising repeating the determining a dynamic tilt, the determining a total tilt, and the setting an amplifier gain tilt.

5. The method of claim 2, wherein the determining a static tilt, the determining an SRS reference tilt, the determining an SRS tilt difference, and the determining a total tilt are collectively performed by retrieving the total tilt from a look up table based on the measured total power, wherein each entry in the look up table maps a predetermined measured total power to a corresponding predetermined total tilt, and wherein the predetermined total tilt is calculated so as to combine:
   the static tilt;
   the SRS reference tilt; and
   the SRS tilt difference based on a difference between the predetermined measured total power and the reference power.

6. The method of claim 2, further comprising determining the power difference between the measured total power and the reference power, wherein the determining an SRS tilt difference includes retrieving the SRS tilt difference from a look up table based on the determined power difference, and wherein each entry of the look up table maps a predetermined power difference to a corresponding predetermined SRS tilt difference.

7. The method of claim 1, wherein the setting an amplifier gain tilt includes setting a gain tilt of the Raman amplifier substantially equal to the total tilt.

8. The method of claim 7, wherein the setting a gain tilt of the Raman amplifier includes:
   injecting multiple Raman pump lasers at different respective wavelengths into the Raman amplifier; and
   setting pump powers of the Raman pump lasers to cause the gain tilt of the Raman amplifier to substantially equal to the total tilt.

9. The method of claim 1, wherein:
   an Erbium Doped Fiber Amplifier (EDFA) is coupled to an output of the Raman amplifier; and
   the setting an amplifier gain tilt includes setting a gain tilt of the EDFA to be substantially equal to the total tilt.

10. The method of claim 1, wherein:
   an Erbium Doped Fiber Amplifier (EDFA) delivers the optical channels to the input end of the optical fiber; and
   the setting an amplifier gain tilt includes setting a gain tilt of the EDFA to be substantially equal to the total tilt.

11. An apparatus comprising:
   a Raman amplifier to amplify optical channels delivered to the Raman amplifier by an output end of an optical fiber having an input end into which the optical channels are injected;
   a photodiode following the Raman amplifier to measure a total power of the optical channels at an output of the Raman amplifier;
   a network interface to communicate with a network; and
   a controller coupled to the Raman amplifier, the photodiode, and the network interface, to:
      determine a static tilt associated with the optical channels in the optical fiber due to wavelength dependent losses or gain of preceding devices;
      measure a total power of the optical channels at the output of the Raman amplifier;
      determine a dynamic tilt associated with the optical channels in the optical fiber based in part on the measured total power, wherein the dynamic tilt is induced by Stimulated Raman Scattering (SRS) in the optical fiber and varies as a function of a total power of the optical signals injected into the optical fiber;
      determine a total tilt with which to offset the static tilt and dynamic tilt; and
      set an amplifier gain tilt applied to the optical signals equal to the total tilt.

12. The apparatus of claim 11, wherein:
   the processor determines a dynamic tilt by:
      determining an SRS reference tilt associated with the optical signals in the optical fiber and a corresponding reference power at the output of the Raman amplifier that would each result if a predetermined total input power and number of the optical channels were injected into the optical fiber with the Raman amplifier set to a predetermined gain; and
      determining an SRS tilt difference from the SRS reference tilt that is induced in the optical fiber based on a difference between the reference power and the measured total power; and
   the processor determines a total tilt by determining the total tilt based on the static tilt, the SRS reference tilt, and the SRS tilt difference.

13. The apparatus of claim 12, wherein the processor determines a static tilt, determines an SRS reference tilt, determines an SRS tilt difference, and determines a total tilt collectively via retrieving the total tilt from a look up table based on the measured total power, wherein each entry in the look up table maps a predetermined measured total power to a corresponding predetermined total tilt, and wherein the predetermined total tilt is calculated so as to combine:
   the static tilt;
   the SRS reference tilt; and
   the SRS tilt difference based on a difference between the predetermined measured total power and the reference power.

14. The apparatus of claim 12, wherein:
   the processor further determines the power difference between the measured total power and the reference power; and
   the processor determines an SRS tilt difference via retrieving the SRS tilt difference from a look up table based on the determined power difference, wherein each entry of the look up table maps a predetermined power difference to a corresponding predetermined SRS tilt difference.

15. The apparatus of claim 11, wherein the processor sets an amplifier gain tilt by setting a gain tilt of the Raman amplifier substantially equal to the total tilt.

16. The apparatus of claim 11, further comprising: an Erbium Doped Fiber Amplifier (EDFA) coupled to the Raman amplifier, wherein the processor sets the amplifier gain tilt by setting a gain tilt of the EDFA to be substantially equal to the total tilt.

17. A computer readable storage media encoded with instructions that, when executed by a processor of an optical receive node including a Raman amplifier to amplify optical channels delivered to the Raman amplifier by an output end of an optical fiber having an input end into which the optical channels are injected, a photodiode to measure a total power of the optical channels at the output of the Raman amplifier, and a network interface to communicate with a network, cause the processor to:
  determine a static tilt associated with the optical channels in the optical fiber due to wavelength dependent losses;
  measure a total power of the optical channels at the output of the Raman amplifier;
  determine a dynamic tilt associated with the optical channels in the optical fiber based in part on the measured total power, wherein the dynamic tilt is induced by Stimulated Raman Scattering (SRS) in the optical fiber and varies as a function of a total power of the optical signals injected into the optical fiber;
  determine a total tilt with which to offset the static tilt and dynamic tilt; and
  set an amplifier gain tilt applied to the optical signals equal to the total tilt.

18. The computer readable storage media of claim 17, wherein:
  the instructions to cause the processor to determine a dynamic tilt include instructions to cause the processor to:
    determine an SRS reference tilt associated with the optical channels in the optical fiber and a corresponding reference power at the output of the Raman amplifier that would each result if a predetermined total input power and number of the optical channels were injected into the optical fiber with the Raman amplifier set to a predetermined gain; and
    determine an SRS tilt difference from the SRS reference tilt that is induced in the optical fiber based on a difference between the reference power and the measured total power; and
  the instructions to cause the processor to determine a total tilt include instructions to cause the processor to determine the total tilt based on the static tilt, the SRS reference tilt, and the SRS tilt difference.

19. The computer readable storage media of claim 18, wherein instructions to cause the processor to determine a static tilt, determine an SRS reference tilt, determine an SRS tilt difference, and determine a total tilt include instructions to cause the processor to retrieve the total tilt from a look up table based on the measured total power, wherein each entry in the look up table maps a predetermined measured total power to a corresponding predetermined total tilt, and wherein the predetermined total tilt is calculated so as to combine:
  the static tilt;
  the SRS reference tilt; and
  the SRS tilt difference based on a difference between the predetermined measured total power and the reference power.

20. The computer readable storage media of claim 18, further comprising instructions to cause the processor to determine the power difference between the measured total power and the reference power, wherein the instructions to cause the processor to determine an SRS tilt difference include instructions to cause the processor to retrieve the SRS tilt difference from a look up table based on the determined power difference, wherein each entry of the look up table maps a predetermined power difference to a corresponding predetermined SRS tilt difference.

21. The computer readable storage media of claim 17, wherein the instructions to cause the processor to set an amplifier gain tilt include instructions to cause the processor to set the amplifier gain tilt by setting a gain tilt of the Raman amplifier equal to a given tilt value.

* * * * *